United States Patent
Boteler et al.

(10) Patent No.: US 9,705,899 B2
(45) Date of Patent: Jul. 11, 2017

(54) DIGITAL FILTER CORRELATION ENGINE

(75) Inventors: Aaron Boteler, Perry Hall, MD (US); Marc Norton, Eldersburg, MD (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 218 days.

(21) Appl. No.: 12/719,621

(22) Filed: Mar. 8, 2010

(65) Prior Publication Data
US 2011/0185418 A1  Jul. 28, 2011

Related U.S. Application Data

(60) Provisional application No. 61/298,310, filed on Jan. 26, 2010.

(51) Int. Cl.
H04L 29/06    (2006.01)
G06F 21/55    (2013.01)

(52) U.S. Cl.
CPC ........ H04L 63/1416 (2013.01); G06F 21/552 (2013.01)

(58) Field of Classification Search
CPC .......................... H04L 63/1416; G06F 21/552
USPC ...................................................... 726/22, 23
See application file for complete search history.

(56) References Cited

U.S. PATENT DOCUMENTS

| | | | | |
|---|---|---|---|---|
| 6,321,338 B1* | 11/2001 | Porras et al. | | 726/25 |
| 6,839,850 B1* | 1/2005 | Campbell et al. | | 726/23 |
| 6,928,549 B2* | 8/2005 | Brock et al. | | 713/194 |
| 7,143,442 B2* | 11/2006 | Scarfe et al. | | 726/23 |
| 7,774,839 B2* | 8/2010 | Nazzal | | 726/22 |
| 7,917,393 B2* | 3/2011 | Valdes et al. | | 726/23 |
| 7,934,254 B2* | 4/2011 | Graham | | 726/22 |
| 8,001,583 B2* | 8/2011 | Waizumi et al. | | 726/3 |
| 8,176,527 B1* | 5/2012 | Njemanze et al. | | 726/2 |

OTHER PUBLICATIONS

J.S. Chitode, Digital Sygnal Processing, 2009, p. 4-5.*

\* cited by examiner

*Primary Examiner* — Oleg Korsak
(74) *Attorney, Agent, or Firm* — Scott J. Asmus

(57) ABSTRACT

A digital filter correlation engine, wherein the correlation engine combines N arbitrary digital filter states based on the weights and along with a threshold generate a network incident. This network incident in turn can be feedback to another digital filter. This multi-layering capability allows the creation of higher level event detections that are time-based for a cyber security analyst to analyze, thereby reducing the amount of manual work the analyst has to do in inspecting behaviors within the network.

5 Claims, 11 Drawing Sheets

Equation 1 Difference Equation

$$y[n] = \sum_{k=0}^{M} b_k x[n-k] + \sum_{k=1}^{N} a_k y[n-k] = h[n] * x[n]$$

DEFCON Configuration Tokens

| Token | Type | Description |
|---|---|---|
| name | string | Name given to the specific instance of DEFCON |
| id | number | Unique plug-in identifier used in the internal incident event structure and used for linking a DEFCON filter to a specific DEFCON incident for two-stage filtering capability. For multiple stage filtering, the order of DEFCON instances instantiations is important. |
| log-events | boolean | If set to "on" the events generated by DEFCON will be logged. If set to "off" the events will not be logged. The default mode is "on". |
| filter-events | boolean | If set to "on" the events will go to the next event filtering plug-on if there is one. This capability allows DEFCON to filter events generated by a previous DEFCON instance in the same packet processing pass enabling multi-stage DEFCON filtering. If set to "off" the events will not go to the next event filtering plug-in. The default mode is "on". |
| sample-file-dir | string | If defined, this directory is pre-appended to all sample file names used to store each filter and event rules internal calculations and samples. |
| event-rule | struct | An event rule definition that specifies when a particular incident event should be created. N event rules can be defined. |
| filter | struct | A filter definition that specifies the digital coefficients, sample period, and input detection sensor. N filters can be defined. |

*Fig. 5*

DEFCON 'event-rule' struct Configuration Tokens

| Token | Type | Description |
|---|---|---|
| id | number | Unique event rule identifier used in the internal DEFCON tables. |
| model | string | A character description of the event rule used in an incident event to provide a description for the end user. |
| threshold | double | The threshold that is used to compare against the cumulative sum of the associated filters with their weights. |
| min-threshold | time | The minimum period between two incident event with the same track. The allowable units are "sec", "ms", "us", "Hr", "Day", and "Wk". |
| filters | list of numbers | The list of filters that this event rule correlates. Each entry in the list is the filter's unique identifier. |
| filter-weights | list of numbers | A list of filter weights that are applied to each filter in the filters list. If not defined, the default weight is 1.0 for each filter. |
| filter-thresholds | list of numbers | A list of thresholds for each filter that must be met before an incident can be generated. If not defined, the default threshold is 0.0 for each filter. |
| sample-file | string | If defined, this is the file name to store the internal calculations of the event rule for analysis. |
| max-samples | number | Maximum number of samples to collect in the sample-file. |

*Fig. 6*

DEFCON 'filter' struct Configuration Tokens

| Token | Type | Description |
|---|---|---|
| id | number | Unique filter identifier used in the event rule's filter list. |
| sensor-id | number | A filter must be associated with some input event stream. This value associates what detection sensor's events are used as input into the filter. |
| period | time | The discrete sampling period used in the difference equation. Over one sample period, the events are cumulative. The allowable units are "sec", "ms", "us", "Hr", "Day", and "Wk". |
| Track | identifier | Defines what input sample granularity the filter operates on. The supported tracks are "all", "host", "port", "ipflow", "tcpflow", "udflow", and "tcpserver". For example, if a filter is for an entire subnet, the track would be set to all with an ipfilter attached to the plug-in. |
| sample | identifier | The two options are "real" or "logical". The logical option uses 1.0 for each event in the input stream. The real option uses the event's real value in the stream. |
| sample-file | string | If defined, each input sample and filter output sample is stored in a comma-delimited format. This sample-file is used for post-processing to examine the behavior of events over time. |
| max-samples | number | Maximum number of samples that can be written to the sample file name. |
| IIR | list of doubles | These are the IIR coefficients of the difference equation. These coefficients apply to the current and previous filter state. They represent the coefficient $a_k$ in the Equation 1 Difference Equation, where k corresponds to the order in the list. |
| FIR | list of doubles | These are the FIR coefficients of the different equation. These coefficients apply to the current and previous input state, i.e. cumulative sums of events in a sample period. They represent the coefficient $b_k$ in the Equation 1 Difference Equation, where k corresponds to the order in the list. |
| queue-size | number | If defined, this specified how many events are queued up. This is used in the incident event creation to display the associated events so further inspection can be done with the raw data. If queue size is not defined, the default queue size is the maximum filter threshold specified in the event rules. If the maximum threshold is 0 than the number of FIR coefficients is used. |

*Fig. 7*

Example Configuration:
```
defcon
{
    name "def-1"
    id 300
sample-file-dir ""

event-rule
    {
        id 1
        model "fireon_x"
        filters [ 1 2 ]
#       filter-weights [ 1.0 1.0 ]
        filter-thresholds [ 2.0 6.0 ]
        threshold 8.0
        min-period 50ms
sample-file "ev1"
        max-samples 200
    } filter
    {
        id 1
        sensor-id 100
        period 25ms
        track host
#       sample-file "fi1"
        max-samples 300
        sample logical
        fir [ 1.0 1.0 ]
#       queue-size 2
    } filter
    {
        id 2
        sensor-id 200
        period 14ms
        track host
#       sample-file "fi2"
        sample logical
        fir [ 1.0 1.0 1.0 ]
#       queue-size 6
    }
}
```

*Fig. 8*

● Customization handled by NIDAR 1.1's Configuration Data Language (CDL)

```
filter
{
    id 1
    sensor-id 100
    period 16ms
    track host
    sample-file "host_samples.csv"
    sample logical
    fir [ 0.34 0.34 0.34 ]
    queue-size 3
} filter
{
    id 2
    sensor-id 200
    period 1ms
    track all
    sample logical
    iir [ 0.5 ]
    fir [ 0.34 ]
    ...
}
```

- Sampling Rate (16ms)
- Unique Filter ID
- Specifies what sensor is the source of the filter's input
- Specifies how filter and input data is stored
- $y_2[n]=0.34x[n]+0.5y[n-1]$

```
defcon
{
    name "def-1"
    id 300
    sample-file-dir ""
    event-rule
    {
        id 1
        model "freon_2_by_3"
        filters [ 1 2 ]
        filter-weights [ 0.8 0.56 ]
        filter-thresholds [ 0.0 0.0 ]
        threshold 5.0
        min-period 50ms
        sample-file ""
    }
    event-rule
    {
        id 2
        model "x86_shellcode"
        filters [ 3 ]
        filter-weights [ 1.0 ]
        threshold 1.5
        min-period 5sec
    }
}
```

- $Y_{2,1} = 0.8y_1[n] + 0.56y_2[n]$
- Minimal required period firing again, for this case 50ms

*Fig. 9*

• Simple run with Anagram, Logger, and Def

```
anagram
{
  name "anagram-1"
  id 100
  type "anagram"
  model "some_pkts_anomalous"
  log-events on
  filter-events on
  train off
  BloomFilter {
    proto tcp
    port 80
    direction both
    threshold 0.2
    filename "train.bf"
  }
}
logger
{
  name "logger-1"
  id 500
  file-dir ""
  file "test.log"
  log-events-to-disk on
  log-packets off
  log-packet-data off
  max-entries 200
}
```

> If log-file name specified, this file will be used for all event logging, else the default filename which changes over time > Maximum messages in the event log file. If default filename is used a new file is opened when reached else log-file is overwritten.

```
defcon
{
  name "def-1"
  id 300
  event-rule
  {
    id 1
    model "freon_x"
    filters [ 1 2 ]
    #filter-weights [ 1.0 1.0 ]
    filter-thresholds [ 2.0 6.0 ]
    threshold 2.0
    min-period 50ms
    sample-file "ev1"
    max-samples 200
  }
  filter
  {
    id 1
    sensor-id 100
    period 25ms
    track host
    sample-file "fil1"
    max-samples 300
    sample logical
    fir [ 1.0 1.0 ]
  }
}
```

Fig. 10

- Event Log File – "test.log"

```
SENSOR.ALERT=1.1.0
Time=20081210-134443.390541
Appliance=Nidar 1.1 @ Columbia
Instance=Testing-1
Sensor_type=anagram
Sensor=anagram-1
Model=some_pkts_anomalous
Alert=Testing-1_anagram-1_20081210-134443_1
Source_host=10.20.30.40
Source_port=58405
Destination_host=128.244.100.200
Destination_port=80
Packet_size=134
Protocol=0
Score=0.870229
Threshold=0.2

CONTROLLER.INCIDENT=1.1.0
Time=20081210-134443.390541
Appliance=Nidar 1.1 @ Columbia
Instance=Testing-1
Model=freon_x
Incident=20081210_2
Host=10.20.30.40
Alert=Testing-1_anagram-1_20081210-134443_1
Alert=Testing-1_anagram-1_20081210-134443_0

CONTROLLER.INCIDENT=1.1.0
Time=20081210-134443.390541
Appliance=Nidar 1.1 @ Columbia
Instance=Testing-1
Model=freon_x
Incident=20081210_3
Host=128.244.100.200
Alert=Testing-1_anagram-1_20081210-134443_1
Alert=Testing-1_anagram-1_20081210-134443_0
```

Filter tracking host (as specified in the configuration)

```
SENSOR.ALERT=1.1.0
Time=20081210-134443.390541
Appliance=Nidar 1.1 @ Columbia
Instance=Testing-1
Sensor_type=anagram
Sensor=anagram-1
Model=some_pkts_anomalous
Alert=Testing-1_anagram-1_20081210-134443_1
Source_host=10.20.30.40
Source_port=58405
Destination_host=128.244.100.200
Destination_port=80
Packet_size=134
Protocol=0
Score=0.870229
Threshold=0.2

CONTROLLER.INCIDENT=1.1.0
Time=20081210-134443.390541
Appliance=Nidar 1.1 @ Columbia
Instance=Testing-1
Model=freon_x
Incident=20081210_2
Tcpflow=10.20.30.40_128.244.100.200:80
Alert=Testing-1_anagram-1_20081210-134443_1
Alert=Testing-1_anagram-1_20081210-134443_0
```

Filter tracking on a tcpflow basis (replace "track host" with "track tcpflow")

Fig. 11

• Filter_1 samples file — "filter_1.csv"

Filter tracking on a host basis
(replace "track all" with "track host")

```
sampling period=0.025 secs
fir coef=1 1
iir coef=1
ip,yn,xm,rep
10.20.30.40,2,0,-1
128.244.100.200,2,0,-1
99.99.99.99,2,0,-1
212.49.198.66,2,0,-1
99.99.99.99,2,2,0
10.20.30.40,2,2,0
212.49.198.66,2,2,0
128.244.100.200,2,2,0
```

Filter tracking tcpflow
(as specified in the configuration)

```
sampling period=0.025 secs
fir coef=1 1
iir coef=1
client,server,port,yn,xm,rep
10.20.30.40,128.244.100.200,80,2,0,-1
99.99.99.99,212.49.198.66,80,2,0,-1
99.99.99.99,253.253.253.253,7,2,2,0
10.20.30.40,253.253.253.253,7,2,2,0
```

*Fig. 12*

DIGITAL FILTER CORRELATION ENGINE

CROSS-RELATED APPLICATIONS

This application claims rights under 35 U.S.C. 119(e) from U.S. Application Ser. No. 61/298,310 filed Jan. 26, 2010, the contents of which are incorporated herein by reference.

FIELD OF THE INVENTION

The present invention relates to network behavioral monitoring and more particularly to network behavioral monitoring using time-based behavioral pattern extraction on sensor states and metrics.

BACKGROUND OF THE INVENTION

In terms of network security, oftentimes a network is under attack for those intent on hacking into a computer system to either disrupt the system or to take over control of the computers residing on the system. Networks employ spam filters and Malware detection as well as detecting login attacks. Most of these approaches involve either signature-based approaches or anomaly-based detection to see if a computer system is under attack.

The problem with prior approaches to network security is that while they are relatively robust in detecting massive attacks that occur for instance within milliseconds, they are unable to detect attacks which are sporadic or take place over long periods of time. In some attacks, the attacker tries to, access system passwords through trial and error. However, if passwords are tried over days, weeks and months, as opposed to seconds, then very cumbersome manual approaches to detecting the attack are sometimes tried. The result however, is that such attacks are not detected at all or are detected too late.

Moreover, while there are a number of reasons to detect different types of attacks, there are nonetheless large numbers of false alarms. These can be due to minor spam attacks or system noise and it is only with difficulty that one can isolate a major high level attack from mere annoyances.

While math models to represent potential behaviors in a network such as artificial intelligence, neural networks and the like use statistical models to ascertain behavior, these models are insufficient for the more stealthy approach of attacking a system periodically over a long period of time.

Thus, there are detectable events when attackers seek to scan a network that because of their complexity are difficult to detect either by a manual inspection of logs or by using models of potential behaviors. Thus, complex attack models involving sophisticated patterns, frequencies or repetitions have heretofore not been automatically detectable, or are masked by false alarms.

As will be appreciated, attackers oftentimes try to determine if they can recognize a system and characterize it by detecting the type of operating system that is utilized and by detecting the type of applications running on the system. This type of scan is called a TCP scan which is an acronym for the Transmission Control Protocol. The TCP protocol is a standard protocol involving a three-way handshake in which a client tries to connect to a server, the server acknowledges the attempt and then the client responds with a final thank you in a three-way handshake. If the scan involves an incomplete transaction, the attacker will try to connect to a server and the server will respond. However the client will never acknowledge the servers response, thereby leaving the server hanging and open. This is what is referred to as an incomplete TCP connection and is one mechanism for denying service.

Moreover, not only are single incomplete sessions an indication of an attack, when there are a large number of incomplete sessions, that also is a symptomatic of a scan.

Note, not only are passwords attempted in order to enter into a system, network sensors can include packet and protocol content inspections. Content inspections look at various parameters such as an http web page and the actual words on a page.

Malware relates to looking for known signatures or known content and behavior models may be employed to ascertain when a system is connecting to a large number of internal hosts. Typically if the system reaches out to a web server, the server may be instructed for instance to double click on a page and go to another site for more information. If for instance the network experiences ten connections per second after one connects to a page for a couple of seconds, this may indicate a Malware attack.

As to network flow detection, flow rates which involve connections to different hosts, can if certain thresholds are exceeded indicate a scan.

More particularly, if an entity seeks to scan a system utilizing an attack mechanism, for instance three times in a row within a short time period, then for simple attacks one can quickly recognize the short-duration repetitive behavior. Such attacks such as SSH login attacks which occur as many as a thousand times a second are readily detectable.

However, if the attack occurs for instance a couple of times throughout a day or perhaps a few times in the succeeding days over extended periods of time, it is very difficult to recognize such attacks with present methods.

Those systems which react to the sensing of an attack so as to report it every time it occurs are plagued with false alarms, called noise. This means that attacks spanning long periods of time are not very easy to pick off. Thus, if an entity seeks to break into a computer with an automated password attack by trying a large number of passwords; if the attack occurs with a massive number of passwords per second, it is quite easy to detect such an attack.

However, if the attacker tries the various passwords over an extended period of time, then it is very likely that such attacks will go on unnoticed.

So-called nation state attacks which seek to gain control over sensitive computers needs only to have one correct password recognized in order to be able to control the computer. Thus, if the attacks occur for instance over a number of months, the instant that a password is successful, the computer is compromised.

Those events which indicate that a scan or attack is in process include incomplete TCP handshaking in which there are no answer-backs. Also the number of TCP resources invoked, if large, is also an indication of the presence of an attack. Moreover, one can analyze packet and protocol contents to sense an attack, as well as utilize conventional Malware detection systems and/or network flow detection.

As noted above, if there are certain Malware attacks, one seeks to identify these attacks due to the particular recognized signature of the attack. These signatures can include the transmission of malicious code and one may not be sure utilizing conventional Malware detection whether a virus or Trojan attack is in fact taking place.

If one looks at the suspected malicious code over a long time period, one may for instance see five occurrences in ten minutes. It is noted that if one sees five occurrences in ten minutes, one is potentially seeing half an occurrence per minute and one might decide that half an occurrence per minute indicate the presence of a Malware attack.

Thus, two problems occur in intrusion detection systems. The first is a false firing on a signature, noting that the false firing may occur hundreds to thousands of times a second, accounting for millions of events during a day, all of which need to be analyzed. Often such attacks involve low quality events that can be ignored.

Without frequency or recurrence filtering, it is very difficult to arrive at a model of behavior characterizing attacks that does not result in an abundance of false-positives.

While password attacks historically utilize a brute force approach. A brute force attack is very clear and obvious when one gets thousands of bad password attacks on an account. However, it is extremely difficult to ascertain that attacks have occurred if for instance the attacker tries one password a minute, or one password a day which tends to fall below the firewall rules that are for instance set to see if three failed password attempts have been made.

Due to the sophistication of attackers, most attackers now extend their attacks over much longer durations such as days, weeks or months and even years, and it is now a necessity to be able to track such attacks with sophisticated analysis.

It is possible to take a look at 10 g histories in order to derive the information necessary to ascertain that an attack has occurred or is process. However, it is clear that such manual approaches or even simple automatic approaches are incapable of countering such long term behavior.

In summary, artificial intelligence and neural networks when properly trained still cannot indicate attacks that occur over very long periods of time. Moreover, simple approaches do not work well and intrusion detection systems will have to require a very high level of computer automation in order to detect the various patterns that an attacker might utilize. Thus, there is a requirement for a threat detection system that depends on a sequence of many events happening over a long period of time to achieve a low false alarm rate.

Note for purposes of the following discussion the following definitions apply:

anomalous packet=a network packet that is in some way unusual compared to other packets.

unknown network flows=a network communication which cannot be deciphered, or categorized as a known communication protocol shellcode detection='shellcode' refers to a malicious piece of code used in part or whole to compromise or takeover a computer system.

DOS response=DOS is a Denial of Service attack, as when an attacker sends a lot of connection requests to a web server, hoping to overload the server. A DOS response is something you would do to mitigate the denial of service, for instance block the attackers communications at a firewall.

TCP flows=a TCP flow is a network communication using the TCP network protocol, also known as a TCP session.

Host=IP, IP is short for an internet protocol address. A Host is a desktop, or a server, each are hosts.

Port=a connection node.

IP flow=IP to IP communication, one computer talking to another in any manner, shape or form.

TCP Flow=Two hosts communicating using the TCP protocol. Tracking this requires a Client IP (the initiator), and the Server IP and Server Port. When one goes to google.com this is over a TCP flow.

UDP flow=IP:Port to IP:Port

TCP Server=a Server IP and the Servers Port Track options include all, host, port, IP flow, TCP flow, UDP flow and TCP server. These are specific options a user would enable when running a Network Intrusion Detection Defense and Response System (NIDAR). Enabling these options tells the NIDAR to track these values across a series of network sessions (TCP flows).

SUMMARY OF INVENTION

According to the present invention, the manual effort heretofore used to extract higher level meaning can be automated through the use of digital filtering and an associated correlation engine that detects sophisticated threats and especially those occurring over long periods of time. Thus, as one feature, the digital filtering removes noise caused by detection of individual events, since the filters can be set to recognize sophisticated attack patterns including the hard-to-detect infrequent attacks that might otherwise be missed. As a result, the subject invention reduces the manual work required by the application of correlation to digital event filters.

It is a feature of the digital filters that they can extract time-based behavioral patterns of interest, and by correlating different digital filter states the higher level meaning desired is known, i.e. an HTTP connection coupled with dense x86 opcode content detection. Because of the ability to set filter parameters, the resultant flexibility of the correlation engine makes it possible for a cyber analyst to obtain automated detection of the higher level events of interest.

More particularly, assuming a single attack vector, the number of events occurring in various time periods may be analyzed and thresholded so as to be able to provide alarm indications for events occurring over long periods of time. For instance a digital event filter may set to detect the number of occurrences of a particular event, per second, per hour, per day, per week, per month or per year, where exceeding the threshold for any one of these time periods results in either an alarm condition being indicated or passage of the thresholded result to the next longer-period digital event filter. Thus, if for instance there are 100 occurrences of an event in an hour, this could trigger an alarm, or the thresholded result can be coupled to the next digital event filter in the sequence, set for instance to accumulate the number of events in a day. The number of events in a day in turn can be thresholded by a threshold set to ten, and exceeding this threshold triggers an alarm. Alternatively, the fact of the exceedance of this ten per day threshold may be coupled to the input of a follow-on digital event filter, for instance set to accumulate the number of events in a week.

By this sequential digital event filtering one can detect attacks that occur over long periods of time, while at the same time selectively ignoring low level occurrences that are too unreliable or too uncertain to be declared an attack.

The use of serial digital event filters provides exceptional flexibility for a cyber analyst to set up an automated system for recognizing various long term attack patterns. This is because the analyst can set the time periods for the recurrence levels to tailor the response of the system to a selected recurrence level based not on the event occurrences themselves, but rather on the number of events for pre-selected time periods.

This type of event detection may also be used for multiple vectors to give a robust indication of a sophisticated attack in which multiple digital event filters can be run in parallel to detect different event vectors, with the results in one embodiment weighted as to severity.

For instance, in one embodiment, for multiple attack vectors, the correlation engine combines the outputs of a number of digital filters, each detecting a different type of attack or attack vector. When the system detects different type attacks occurring during the same time period, then the presence of an attack can be robustly ascertained.

As mentioned above, it is possible to weight the sensor results to give more weight to more important attacks. In this case the correlation engine may be based on N arbitrary digital filter states. These states may be weighted and thresholded such that a weighted network incident can be generated. Moreover, this network incident in turn can be combined with other digital filtering.

This multi-layering capability allows the creation of higher level event detections that are time-based for a cyber security analyst to consider, thereby reducing the amount of manual work the analyst has to do in inspecting behaviors within the network.

Note that each of the above digital filters is set to accumulate a predetermined number of events that occur in a predetermined time period. The result is an extremely flexible system for the cyber analyst to be able to address not only the various attempts that can occur, but also to be able to recognize these events over longer and longer periods of time without manual log inspections.

In summary, the utilization of one or more vector sensors and one or more digital event filters results in a digital event filter correlation engine, called a DEFCON engine, which takes into account the occurrence time lines of the particular events sensed. With the use of the digital filter correlation engine, false alarming is dramatically reduced, while at the same time providing an exceptionally robust attack detection modality.

BRIEF DESCRIPTION OF THE DRAWINGS

These and other features of the subject invention will be better understood in connection with the Detailed Description, in conjunction with the Drawings, of which:

FIG. 5 is a chart showing DEFCON configuration tokens;

FIG. 6 is a chart showing DEFCON event rule struct configuration tokens;

FIG. 7 is a chart showing DEFCON filter struct configuration tokens;

FIG. 8 is a program listing of an example of a DEFCON configuration for an example run;

FIG. 9 is a program listing for an example run showing the status of the subject system;

FIG. 10 is a program listing of an example run showing detecting anagram and logger attacks;

FIG. 11 is an event log showing a test log file; and,

FIG. 12 is a table showing a filter sample file for an example run.

DETAILED DESCRIPTION

Figure 1:
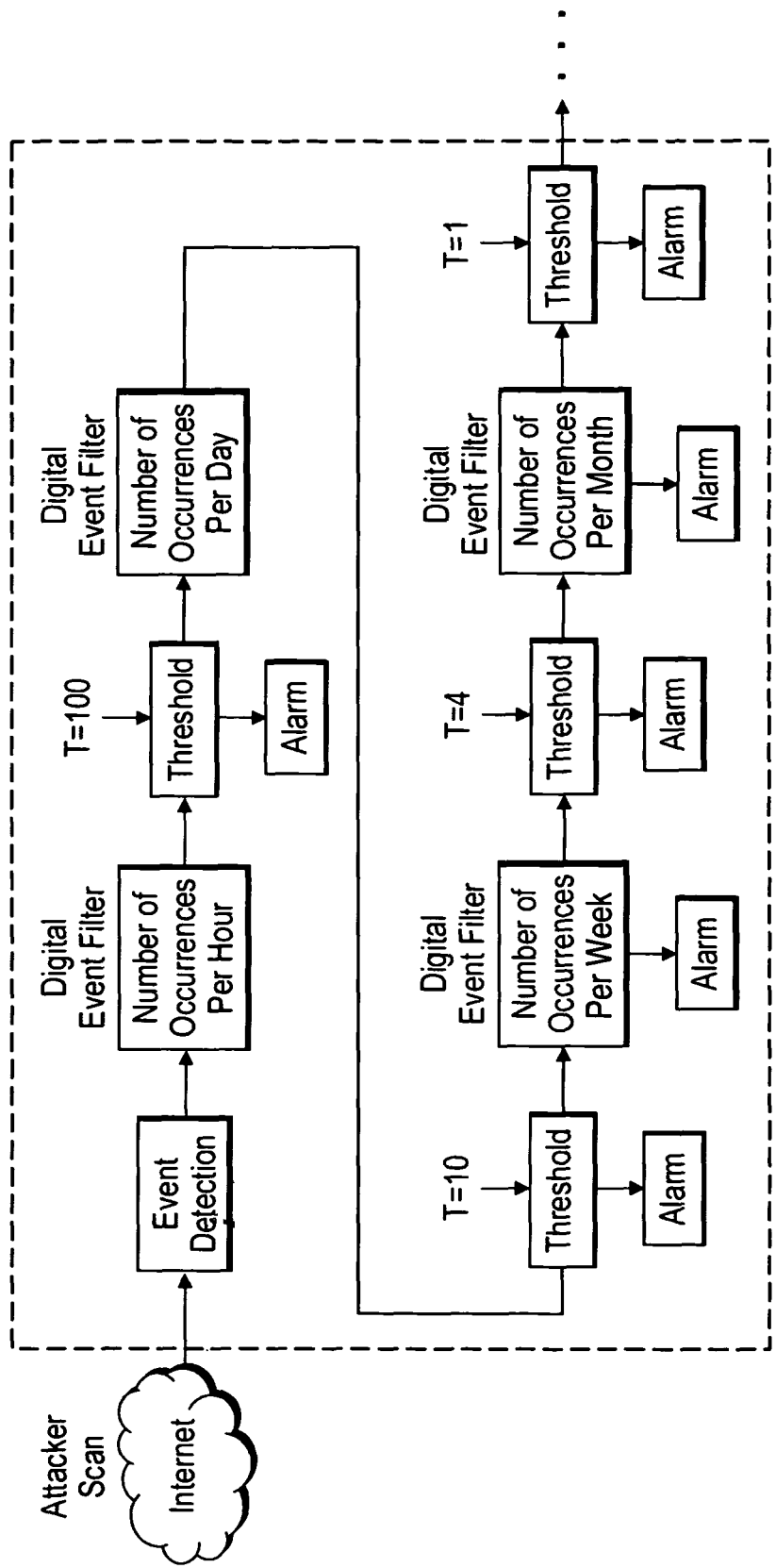
FIG. 1 is a block diagram of a digital event filter correlation engine for detecting the presence of an attack on a computer system.

Referring now to FIG. 1, a Digital Event Correlation Engine, DEFCON, 10 incorporates an event detection sensor 12 which is designed to detect a particular type of attack generated by an attacker scan 14 and delivered over the internet 16.

For purposes of illustration only, a single type of event detector or sensor is first described. The event can be indicated by for instance anomalous packet detection, unknown network flow detection, shellcode detection, and denial of service attack detection; and through the use of metrics including excessive shellcode Ngram matches to a TCP server that is under attack. Note, the term shell code refers to small pieces of code used as a payload in an exploitation, with Ngram referring to phonemes, syllables, letters, words, or other base pairs that are for instance utilized in password attacks.

As will be discussed hereinafter, various types of intrusions or events can be detected.

Single Vector Sensing

In one embodiment, a digital event filter 20 can be characterized as having an accumulator 21 section set to a particular number of occurrences per time period for the sensed event. In this example the time period is one hour. As part of the digital filter 20, accumulator 21 is coupled to a threshold circuit 22 section. When, as illustrated by threshold circuit 22, 100 detected events within an hour exceed a T=100 threshold an alarm condition is initiated by activating an alarm 24.

The output of threshold circuit 22 can also be coupled to a follow-on digital event filter 26 characterized by an accumulator 27 section which is set up to count the number of occurrences per day, as opposed to per hour. In this characterization of filter 26, accumulator 27 is coupled to a threshold circuit 28 section. The number of events per day is thresholded by threshold circuit 28 having its threshold set to T=10, such that when 10 detected events occur in a day, an alarm condition is initiated by activating an alarm 30.

The output of threshold circuit 28 in one embodiment is coupled to an even further follow-on digital event filter 32 characterized as having an accumulator section 33 which is set to count the number of events per week. In this characterization, accumulator 33 is coupled to a threshold circuit 34 section which has a threshold T=4 set, such that when the number of detected events per week exceeds four, an alarm condition is initiated by activating an alarm 36.

Finally, the output of threshold circuit 34 is coupled to a further follow-on digital event filter 40 characterized as having an accumulator section 41 set to count the number of detected events per month. Accumulator 41 is coupled to a threshold circuit 42 section of filter 40 and has a threshold set to T=1 such that if one such occurrence occurs during a month, an alarm condition is initiated to activate an alarm 44.

What will be seen is that each of the digital event filters is configurable to count the number of events detected over a predetermined time period that exceed a preset threshold to provide an alarm when the number of occurrences for that time period exceed this threshold.

In one embodiment, if one is looking not for the number of occurrences per hour nor per day; but rather per week in order to establish the existence of an intrusion, then if the attack takes place over a week as opposed to days, hours, minutes or seconds, then the initiation of an alarm condition robustly indicates the occurrence of the event.

It will be appreciated that the digital event filters can be programmed for the time period over which they are to operate. These units therefore provide a filter which inhibits outputs until such time as the threshold number of events per time period is exceeded.

While it is possible to provide an indication of the gross number of events per time period, the subject thresholding fires an alarm only when the number of occurrences per time period exceed a predetermined threshold.

Of course it is possible to indicate the gross number of occurrences per hour, day, per week and per month or any specified time period which will give the analyst some indication of the type of attack that is underway for the particular sensor or event detection that is utilized.

However, when these events occur over long periods of time the analyst can set the thresholds to correspond to the longest time period that the analyst expects an attacker to use.

Thus, the flexibility of a single event detection system utilizing multiple digital event filters provides the analyst with a large number of ways to view incoming attacks and to sort them based on various time periods. As a result, the analyst can tailor the system by tailoring the time periods and the thresholds.

Figure 2:
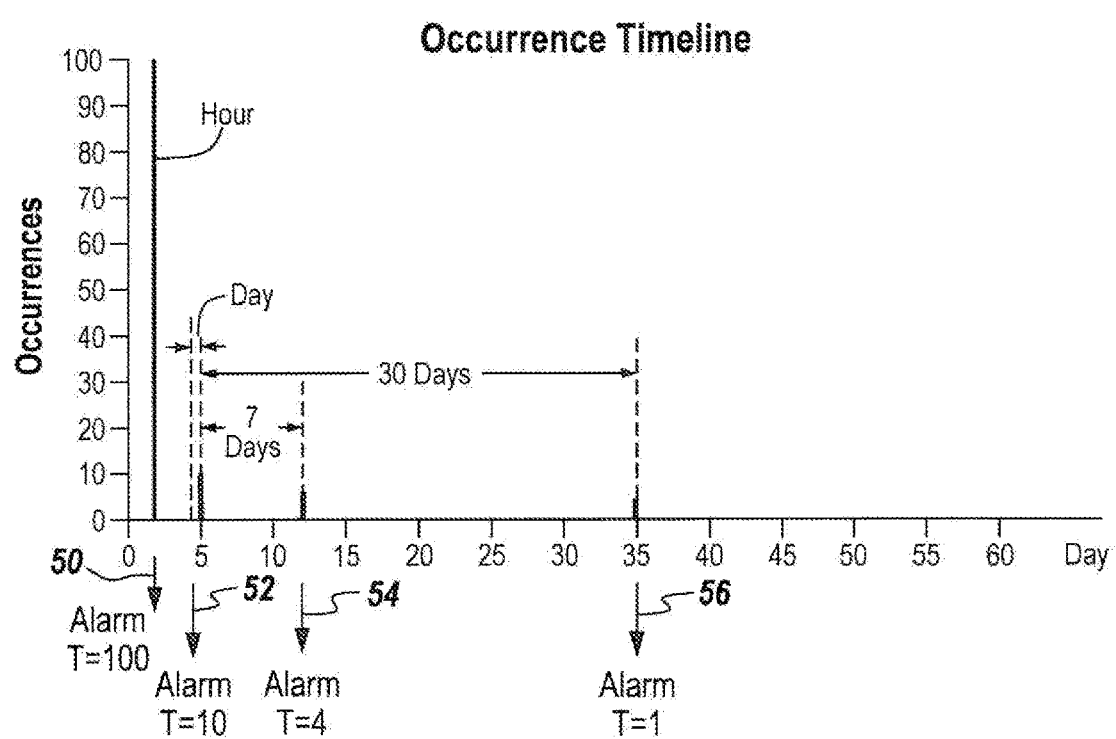
FIG. 2 is a graph showing an occurrence timeline for event occurrences that occur within an hour, within a day, within seven days and within thirty days showing respective alarm thresholds of 100, 10, 4 and 1.

Referring to FIG. 2, in one embodiment assuming that successive digital event filters operate with time periods of one hour, one day, seven days and thirty days, it can be seen that if there are 100 event occurrences in a given hour then an alarm signal such as illustrated by arrow 50 can be generated. Likewise, for a given day assuming there are ten event occurrences during the day, as illustrated by arrow 52, the corresponding alarm can be generated. With respect to a weeks worth of events, meaning seven days, if the number of events are greater than for instance four during the week, an alarm can be generated as illustrated at 54, whereas if one is looking at a thirty day or one month time period, then if for instance there is one event in that time period, then an alarm as illustrated at 56 will be generated.

By setting the time constants for the particular digital event filters one has one type of control over the filtering of the incoming data, whereas setting a particular threshold of the number of events that occur during this time period offers another level of sophistication to be able to ignore lower level attacks.

Multiple Vector Sensing

While the digital filters may be used by themselves to sense a single vector, the use of a digital filter by itself may be incapable of detecting sophisticated attacks. For this purpose multiple digital filters addressing different vectors present a better picture of what is happening. There are a number of different vectors that can indicate an attack. For instance, the high occurrence of an anomalous packet content (anagram) can indicate an attack. Detecting this vector can be accomplished by configuring the associated filter to be a high pass filter on anomalous packets. Another indication of an attack is the presence of untrusted data flows. Thus, a different filter may be provided to ascertain that the same packets contain untrusted data flows relating to attack behavior and the associated filter is configured to be a pass through filter on untrusted data flows.

Finally a still further filter may be one that detects when a network appliance experiences large spikes in denial of service, synchronize and acknowledge floods or other network metrics, with the filter serving as a high pass filter for instance on half-open TCP connections.

Figures 3, 4:
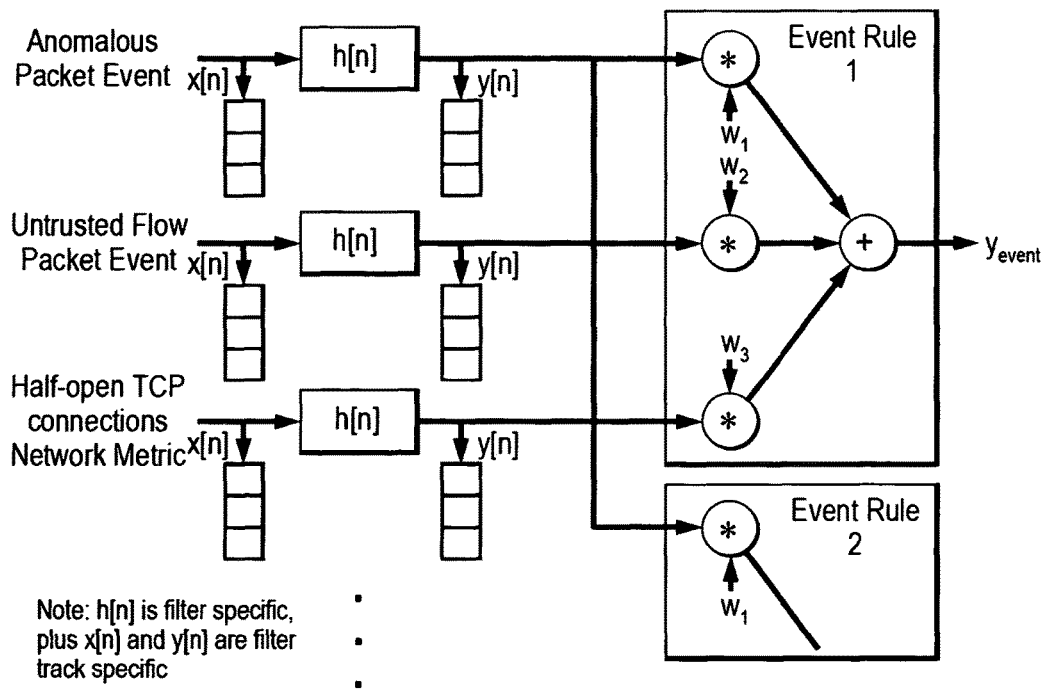
FIG. 3 is a block diagram of the subject system showing filters related specifically to anomalous packet events, untrusted flow packet events and half open TCP connections, with the filtered output for occurrences occurring within a predetermined equation reference goes heretime period being weighted and summed, wherein the weighted result indicates an attack event.
FIG. 4 is a difference equation that describes the operation of the filters of FIG. 3.

In order to detect different vectors and referring now to FIG. 3, an event rule can contain N filters, each detecting a different vector and each with an assigned weight, a threshold and a minimum incident firing, where minimum incident firing means The filter satisfied its thresholds a specific number of times. The result is a linear combination of the current number of detected events for each filter is summed and thresholded. If the threshold is exceeded then it can be reliably determined that an attack has occurred involving one or more of the vectors and one can dump the associated track queues for review by a security analyst.

In one embodiment there are three structures involved, namely an event rule, a filter and a track, with the event rule containing N filters and the filter containing P tracks. Here a track refers to a particular vector.

In one embodiment, the memory architecture of the subject engine includes an event rule which contains a filter ID array, a filter reference array and a filter weight array. The filters contain an infinite impulse response array (IIR), a finite impulse response (FIR) array, a track hash table, and an event rule ref linked list.

Finally in terms of the memory architecture, tracking includes a key, a y[n] array, an x[m] array, an event and packet linked list and a filter reference, where y[n] refers to a filter event-result for an x[n] sample. And x[m]=input data samples.

More particularly, when for instance different types of sensors are used to detect different types of attacks or vectors and referring again to FIG. 3, a filter function 60, 62 and 64 can be set to detect for instance an anomalous packet event 66, an untrusted flow packet event 68, or a half open TCP connection 70.

These events are detected and the digital filter characteristic is set up to detect the number of such events for the particular time period set up for the filter. Thus h[n] is the specific filter function, whereas x[n] and y[n] are filter track specific. The input samples to the filters having the filter characteristics indicated at 60, 62 and 64 are respectively labeled x[n], whereas the number of events occurring within the time period for each of the filters is labeled y[n].

For event correlation, the outputs of these filters are combined in an event rule module 70 which in one embodiment multiplies weights $W_1$, $W_2$ and $W_3$ with the numbers output respectively from filters 60, 62 and 64. These weights are multiplied as illustrated at 72, 74 and 76, with the numbers associated with the outputs of the aforementioned filters. Thus, in one embodiment, the weights are cross multiplied with the filter outputs, with the outputs of multipliers 72, 74 and 76 being summed at a summation node 78 as illustrated.

The raw number associated with the output from summation node 78 is an indication of an attack, along with its severity provided by the weighting functions.

Thus what is shown in FIG. 3 and in fact by the Equation 1 of FIG. 4 is that filter output y[n] is related to the number of occurrences of a specific event over a specific period of time. If there were no weighting involved and in fact only one vector were involved, then the diagram of FIG. 3 would devolve into the diagram of FIG. 1. However, by providing numbers of different sensors for different types of attacks and providing different granularities, as well as different weights, the indication of an attack ranked in accordance with severity can provide the analyst with the information necessary to understand that an attack has in fact occurred, that the attack is important and that he or she should look into the logs to try to determine the source of the attack.

What is provided is the application of digital signal processing theory to network sensors and metrics, along with a correlation engine to extract and react to time-based behavioral events relating to potential attacks.

What is now described is a rigorous mathematical characterization of the system of FIGS. 1 and 3 through the use of a general digital filtering equation. However, prior to describing the general digital filtering equation of FIG. 4, the events to be analyzed by the sensed system are those that occur at non-equidistant time intervals. Thus, the events do not occur for instance every two seconds for instance. The events that are measured occur when a rule fires and this does not usually occur at a uniform rate. In order for the subject system to detect an attack, the system has to figure out when one has a current sample how long ago the last sample was. To do this it is possible to characterize the subject filtering system using the general digital filter equation (Equation 1) of FIG. 4.

Note that for the time independent components and for an infinite impulse response, one simply takes the previous state of the system and adds the effects of the current event independent of time. This is what the $b_k x[n]$ term represents in the Equation 1. The time component effect is represented by the $a_k x[n]$ term.

What is done is to create a digital filter which is a set of coefficients that describe a curve that represents the shape of the curve one is looking for, i.e. the curve that one would draw around the sequence of events that occur over time that would indicate an attack. This process is similar to what one obtains with a Fast Fourier transform. In the subject case the digital filter is established by specifying the shape of the desired curve and the coefficients needed to describe that curve. When one generates those coefficients, then all that is needed is to apply these coefficients to the current input samples.

If the current input sample of events times those coefficients generates the curve corresponding to an attack, then one has found the data one is looking for. If the coefficients generated from the theoretical curve times the actual physical event data does not generate the expected curve corresponding to an attack, then one knows that data set does not represent an attack.

The subject system can therefore be characterized by defining a curve that looks a shape denoting an attack and then generating the coefficients. This can be done by hand if one has a simple curve.

Once one generates the coefficients then it is only a matter of determining if the data looks like the data that is described by the posited curve. In the subject case, the filter used is a simple digital filter that says by entering fields in a configuration language to specify for instance "detect 3 events every 2 seconds", an attacking-indicating curve is posited. This curve is one that one could draw around the event. If one draws a curve over time, in the above example one could draw 3 spikes every 2 seconds and that would represent the shape of the attack-indicating curve.

However, in the subject system one does not have to go through the effort of defining a curve. Rather one can use a simple configuration language.

The appended source code describes the custom configuration language data structure to provide for the necessary filter functions. (See Appendix).

This source code defines the Configuration Data Language (CDL) grammar which is a simple token name space value language that supports data structures.

By way of example, referring to FIG. 8, a data structure is shown. Here a token name is used followed by a left curly brace, with the data located inside the left curly braces and then a right curly brace. Thus, the curly braces encapsulate the data associated with this data structure.

Other than that, all entries involve a name, space and a value. Thus, the data language is simply a name value language, i.e. names followed by a value, where the value can be a number, a string, or an array of numbers whose name value pairs are contained inside data structures that are identified by a name and a left curly brace, data and then a right curly brace.

Referring now to FIG. 5, what are shown are example configuration tokens that refer to the fields entered in the subject custom data structure. The same is true for FIG. 6 which specifies fields for the Event Rule data structure, one example of which is in FIG. 8. Note these tables specify all configurable items in the configuration file. As to FIG. 7, this specifies the filter structure configuration tokens that are enterable items for the particular filters.

Digital Event Filter Correlation

More specifically, Equation 1 of FIG. 4 is an equation which describes the operation of the filters. Note also that sensors and metrics are sampled to produce filter input samples, i.e. x[n] and involve a time-based sample period in which the sensor events are cumulative within the sample period.

The filter state is defined by y[n] which is the response of the input samples to the system response or filter. Thus $y[n]=h[n]*x[n]$, where h[n] is the filter response.

As will be appreciated, design and analysis of a filter is commonly instantiated by using the z transform and input samples from the filters, in one embodiment are analyzed by using a discrete Fourier transform (DFT). Thus input samples are analyzed based on a time-based 1/frequency view of the input samples, with the magnitude of a plot displaying how many sensor events occur with different frequencies. The time-based view is extracted from the sampling period and the spectral content at a frequency F in the magnitude plot. As will be appreciated, the filters can be set for example to be two events every five seconds, twelve events every fifteen seconds, twenty five events every fifty seconds or indeed span much longer periods of time.

As the metric data flows from point A to point B, a filter state y[n] and input stream x[n] must be unique to that data flow, with the filter state being applicable to network sensors not metrics. On the other hand security events of interest, i.e. incidents, occur in data flows.

It is noted that different scenarios require tracking different data flows. The different data flows to track include all activity that falls under a network intrusion defense and response (NIDAR) system including IP table filter, host-IP, port, IP Flow-IP to IP, TCP flow Client to/from Server:Port, UDP flow-IP:Port to IP:Port, and TCP Server meaning data flow Server:Port, where these terms are defined as follows:
IP table filter=A filter with IP addresses, it is used to filter IN or OUT packets with the specific IP addresses contained in the filter.
host-IP=IP Address of a host computer port=A TCP or UDP port number, between 0 and 65535
IP Flow=an IP to IP communication, and includes any packets sent between two IP host addresses.

TCP flow=A communication of any TCP packets flowing from a TCP Client to and from a TCP Server on a specific server port UDP flow=A communication of any UDP packets flowing from one host IP and Port to another host IP an Port TCP Server=A computer acting as a Server, ie. Providing a computer service, such as a Web Server providing the HTTP web service. The TCP server is identified by its host IP and the particular port I uses to communicate over. IN the case of Web traffic, the HTTP service uses Port 80, for instance.

Note that each data flow track contains y[n] queue filter states x[mq] input samples, a time stamp of the current sample period and an event queue for instance that stores events and associated packet for each x[m]>zero.

What is now described is the customization handled by the subject system utilizing the above custom configuration data language, followed by a number of example runs.

Referring again to FIGS. 5, 6 and 7, a listing of configuration tokens is described to define the meaning of various terms and the type of string utilized.

In FIG. 5, the DEFCON configuration tokens are described which when set describe the indicated functions. For instance, log events log the detected events, whereas filter-events activate the serial digital filtering functions. Note the event rules for a particular event are specified by the event rule creation.

With respect to FIG. 6, the event rule structure configuration tokens are described in which for instance the model token describes for the user the particular event rule used, the threshold defines the threshold that is used to compare against the accumulator sum with weights, whereas a minimum threshold describes the time period over which events are collected. Filters are defined by numbers, and filter weights are described by a filter weight number. Moreover, filter thresholds are a list of thresholds for each filter, with "sample-file" token referring to the file name to store the internal calculations utilized in an event rule to permit analysis, whereas "max-samples" refers to the maximum number of samples to collect or store in the sample file.

Finally, FIG. 7 specifies filter structure tokens in which filters are identified, in which the discrete sampling periods for the accumulators of FIG. 1 are identified, and in which a track identifies or defines what input sample granularity the associated filter operates on. Note, in one embodiment, the sample token specifies two options, namely a "real" option or a "logical" option. The sample file token relates to the storage of samples for post processing and the "max sample" again specifies the maximum number of samples that can be written to the sample-file name.

Note that an infinite impulse response (IIR) array has coefficients that can be specified that apply to the current and previous filter states, whereas a finite impulse response array (FIR) specifies coefficients that apply to the cumulative sum of events in a sample period. Finally, a queue size token is used to specify how many events are queued up so that associated events can be presented for further inspection.

How these tokens are utilized in the subject digital filter correlation engine can be seen by the previously described example configuration of FIG. 8.

In one example of the subject system, in FIG. 9 the system status is described for the network intrusion defense and response system using the above custom configuration language. FIG. 10 shows an example run involving anagrams and logger attacks, whereas FIG. 11 shows an event log file. Finally, FIG. 12 shows the filter sample file for an example run.

The aforementioned digital filters filter sensor events and metrics assume that time based signatures correlate with network behavior. Note that sensor events include such things as anomalous packet detection, unknown filter flow detection, shellcode detection, DoS detection and the detection of TCP SYN or synchronize acknowledge floods, and TCP flows.

Note also that the subject utilizes tracking granularities for network sensor filters including filter state and input samples queued per track, as well as track options that include all, host, port, IP flow, TCP flow, UDP flow, TCP server and other options.

Note also there are various options available to a user to track values across a series of network sessions or TCP flows.

The subject digital event filter correlation engine is therefore able to correlate one to N digital filter results to produce meaningful events of interest. The subject system is therefore uniquely able to detect small monthly IP flow with high anomalous scores which would for instance indicate a nation state attack. The system can also detect excessive shellcode Ngram matches to a TCP server to indicate a server is under attack and can detect high frequency content with shellcode detected sensor events, or can apply high pass filters to shellcode detected sensor event samples.

Those skilled in the art will appreciate that the correlation engine of the present invention can work as a linear or time based tools, but also allows frequency based behavior, layered frequency behaviors, and feedback mechanism typical of digital filters.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A digital event filter correlation engine for ascertaining an attack on a computer by filtering incoming data, comprising:
    computerized device having a non-transitory computer readable medium and a processor;
    a plurality of event sensors stored on the non-transitory computer readable medium and executed on the processor, the plurality of event sensors coupled to incoming data for sensing a plurality of predetermined attack events, wherein the plurality of predetermined attack events occur at non-equidistant time intervals, wherein each of the plurality of event sensors is configured to simultaneously sense associated event vectors from a plurality of event vectors, and wherein each of the plurality of sensors provides a corresponding output;
    a plurality of digital event correlation filters stored on the non-transitory computer readable medium and executed on the processor, the plurality of digital event correlation filters coupled to the outputs of each of the plurality of event sensors, wherein each digital event correlation filter of the plurality of digital event correlation filters is established by specifying a shape of a curve described by a set of coefficients, the curve encompassing at least a portion of the plurality of predetermined attack events over a period of time, wherein the shape of the curve denotes the attack, wherein each digital event correlation filter of the plurality of digital event correlation filters has a weight, a threshold value, and a minimum incident firing, and wherein the minimum incident firing indicates that a digital event correlation filter of the plurality of digital event correlation filters has satisfied its threshold a pre-defined number of times; and wherein each of the plurality of digital event correlation filters is configured to generate an output when the count number of their associated event vectors sensed exceeds their associated threshold value and their associated minimum incident firing; and wherein generated output of each of the plurality of digital event correlation filters is multiplied by the weight associated with each of the plurality of digital event correlation filters; and an alarm is activated when sum of the weighted output of each of the plurality of digital event correlation filters is above another threshold.

2. A digital event filter correlation engine for ascertaining an attack on a computer by filtering incoming data, comprising:

a computerized device having a nor-transitory computer readable medium and a processor;

an event sensor stored on the non-transitory computer readable medium and executed on the processor, the event sensor coupled to the incoming data for sensing a predetermined attack event, wherein the event sensor is configured to sense event vectors, and wherein the event sensor provides an output;

a plurality of digital event correlation filters stored on the non-transitory computer readable medium and executed on the processor, wherein each of the plurality of digital event correlation filters is established by specifying a shape of a curve described by a set of coefficients, the cure encompassing at least a portion of the predetermined attack event over a period of time, wherein the shape of the curve denotes the attack, wherein each of the plurality of digital event correlation filters is configured to count number of the event vectors occurrences sensed for a pre-defined time period and each of the plurality of digital event correlation filters has a different pre-defined threshold value and different pre-defined time period, and wherein each of the plurality of digital event correlation filters is coupled to its corresponding alarm from a plurality of alarms;

and wherein a first digital event correlation filter from the plurality of digital event correlation filters is provided with the output of the event sensor, and wherein the first digital event correlation filter and remaining event correlation filters of the plurality of digital event correlation filters are sequentially coupled to each other in an ascending order of theft associated pre-defined time periods;

and wherein the first digital event correlation filter of the plurality of digital event correlation filters is configured to generate a first output when the count number of the event vectors sensed for its first pre-defined time period exceeds its pre-defined threshold value;

and wherein a first alarm is activated upon the first output of the first digital event correlation filter and a result of the first pre-defined threshold count is sent to a digital event correlation filter of the remaining event correlation filters of the plurality of digital event correlation filters having a next longer pre-defined time-period.

3. The digital event filter correlation engine for ascertaining the attack on the computer by filtering the incoming data of claim 1, and further including an event rule accumulator for accumulating the outputs of the each of the plurality of the digital event filters associated for each of the plurality of predetermined event vector sensors to establish an accumulated number magnitude such that the magnitude indicates the severity of the attack, whereby said magnitude is based on said number of the plurality of event sensors.

4. The digital event filter correlation engine for ascertaining the attack on the computer by filtering the incoming data of claim 3, and further including a threshold unit for thresholding the outputs accumulated by the event rule accumulator and an alarm indicator for indicating an event vector based on said output of said threshold unit.

5. The digital event filter correlation engine for ascertaining the attack on the computer by filtering the incoming data of claim 1, wherein said sensed attack includes at least one of an anomalous packet, unknown network flows, shell code detection, denial of service, a TCP flow, an anomalous packet event, an untrusted flow packet event, a login attack and a half-open TCP connection.

* * * * *